Patented Apr. 19, 1949

2,467,451

UNITED STATES PATENT OFFICE 2,467,451

MANUFACTURE OF CYCLIC ALIPHATIC DIHYDROXY COMPOUNDS

Donald Peter Young, Spondon, near Derby, England, assignor, by mesne assignments, to Celanese Corporation of America, a corporation of Delaware No Drawing. Application September 21, 1945, Serial No. 617,932. In Great Britain October 9, 1944

3 Claims. (Cl. 260—631)

This invention relates to the manufacture of cyclic aliphatic dihydroxy compounds.

According to the invention cyclic saturated aliphatic dihydroxy compounds in which both hydroxyl groups are attached to the ring are made by subjecting to catalytic hydrogenation cyclic saturated aliphatic mono-hydroxy mono-ketones in which the hydroxyl group and ketonic oxygen atom are both attached to the ring.

The invention is primarily concerned with the production of cyclic aliphatic dihydroxy compounds in which the hydroxyl groups are attached to adjacent carbon atoms in the ring, and I have found that the catalytic hydrogenation of cyclic saturated aliphatic alpha-hydroxy ketones to give these dihydroxy compounds proceeds in a remarkably satisfactory manner, and gives the dihydroxy compounds in almost theoretical yields. For example dihydroxy compounds can be made in this way from alpha-hydroxy derivatives of the unsubstituted cyclic aliphatic ketones, especially cyclopentanone, cyclohexanone and cycloheptanone, and from alkyl substitution products of these alpha-hydroxy derivatives.

Examples of the dihydroxy compounds which can be made by the process of this invention are:—cyclopentane-1:2-diol from cyclopentane-1-ol-2-one, cyclohexane-1:2-diol from cyclohexane-1-ol-2-one (adipoin), 1-methyl-cyclopentane-1:2-diol from 1-methyl-cyclopentane-1-ol-2-one, 1-methyl-cyclopentane-2:3-diol from 1-methyl-cyclopentane-2-ol-3-one, 1-methyl-cyclohexane-2:3-diol from 1-methyl-cyclohexane-3-ol-2-one, 1-methyl-cyclohexane-3:4-diol from 1-methyl-cyclohexane-3-ol-4-one, 1:4-dimethyl-cyclohexane-2:3-diol from 1:4-dimethyl-cyclohexane-3-ol-2-one, 1:1:4-trimethyl-cycloheptane-3:4-diol from 1:1:4-trimethyl-cycloheptane-4-ol-3-one.

A particularly useful application of the invention is the manufacture of cyclohexane-1:2-diol by the catalytic hydrogenation of adipoin, and the invention will be described in more detail by reference to this reaction. Other cyclic aliphatic hydroxy ketones including those listed above can be hydrogenated to the corresponding dihydroxy compounds under substantially the same conditions as adipoin.

Adipoin exists in two distinct forms, one a liquid and one a solid, and the liquid form on standing usually changes slowly into the solid. The exact structures of these two forms of adipoin are not certainly known, but it is believed that the liquid form is the true monomeric cyclohexane-1-ol-2-one, while the solid form is either an isomer thereof (for example an enolic or epoxide form) or a dimer or low polymer. It is convenient to store adipoin in the solid form, but as this is relatively inert and is insoluble in most solvents it is advisable to convert it into the liquid form before subjecting it to the hydrogenation. This may readily be done by fusing the solid at about 120° to 130° C., or by digesting it for some time with a boiling solvent.

In the preferred method of effecting the hydrogenation the adipoin is heated with hydrogen under pressure in the presence of a nickel or cobalt hydrogenating catalyst. Preferably the catalyst is supported on a carrier, for example kieselguhr, silica gel or the like, but if desired the carrier may be dispensed with and an unsupported catalyst, especially a porous catalyst mass such for example as Raney nickel, may be used.

When a nickel or cobalt catalyst is used, the hydrogenation of the adipoin is best carried out at a temperature above 100° C. and under a pressure of hydrogen of at least 50 atmospheres and preferably between 70 and 200 atmospheres. Advantageously temperatures between 120° and 170° C. and hydrogen pressures between 70 and 150 atmospheres are employed.

The hydrogenation may conveniently be carried out as a batch process by heating the adipoin in the presence of the catalyst and in an atmosphere of hydrogen under the requisite pressure in an autoclave or other vessel capable of withstanding the pressure. Preferably the adipoin is dissolved in a suitable solvent, especially methanol, and it is advisable to agitate the solution during the hydrogenation, for example by means of a stirrer which may be slow running, or by rocking or rotating the autoclave or other vessel in which the hydrogenation is being performed. As hydrogen is taken up by the adipoin the pressure loss my be made good by introducing fresh hydrogen, or the pressure may be allowed to drop provided that it does not fall below 50, or preferably 70, atmospheres. The fall in pressure affords a useful means of following the progress of the reaction.

The cyclohexane-1:2-diol produced by hydrogenating adipoin is a mixture of the cis and trans forms. If it is desired to obtain either the cis or the trans form in the pure state, this may be done for example by fractional crystallisation from benzene or some other suitable solvent.

The invention makes possible a new and useful method of obtaining cyclic aliphatic dihydroxy compounds from cyclic aliphatic mono-ketones or mono-alcohols, for example from cyclopentanone, cyclohexanone and cycloheptanone or from cyclopentanol, cyclohexanol and cycloheptanol, or from alkyl substitution derivatives of these cyclic ketones and alcohols. In this method the cyclic ketone or alcohol is chlorinated, whereby there is obtained from either ketone or alcohol a mono-chlor-ketone; this is hydrolysed to the corresponding hydroxy ketone, which is then hydrogenated to the dihydroxy compound as described above. For example cyclohexanone or cyclohexanol may be chlorinated to give 1-chlor-cyclohexane-2-one, which on hydrolysis, e. g. with a hot concentrated solution of a weak alkali such as sodium carbonate, gives adipoin, which can be hydrogenated by the process of the invention to give cyclohexane-1:2-diol. In these reactions the chlorine may be replaced by bromine.

The following example illustrates the invention:

*Example*

35 parts by weight of adipoin dissolved in twice its weight of methanol was introduced into a rocking autoclave containing 3 parts by weight of a catalyst consisting of nickel supported on kieselguhr. The autoclave was heated to 150° C. and hydrogen introduced to a pressure of 120 atmospheres. The hydrogen pressure at once began to fall, and the reaction proceeded rapidly until the pressure had fallen to practically the full extent calculated for the complete reduction of the adipoin to cyclohexane-1:2-diol. The autoclave was then allowed to cool, excess hydrogen was blown off, and the liquid products were filtered free from the catalyst. On evaporating off the methanol there remained a mixture of the cis and trans forms of cyclohexane-1:2-diol in approximately theoretical yield.

Having described my invention, what I desire to secure by Letters Patent is:

1. Process for the manufacture of cyclic saturated aliphatic di-hydroxy compounds in which the hydroxyl groups are attached to adjacent carbon atoms in the ring, which comprises heating a solution of a cyclic saturated aliphatic alpha:beta hydroxy-ketone in an organic solvent to a temperature of 120° to 170° C. under a hydrogen pressure of between 70 and 200 atmospheres throughout the process in the presence of a catalyst selected from the group which consists of nickel and cobalt deposited on a carrier.

2. Process for the manufacture of cyclo-hexane-1:2-diol, which comprises heating a solution of adipoin in methanol to a temperature of 120° to 170° C. under a hydrogen pressure of between 70 and 200 atmospheres throughout the process in the presence of a catalyst consisting of nickel deposited on a carrier.

3. Process for the manufacture of cyclopentane-1:2-diol, which comprises heating a solution of cyclopentane-1-ol-2-one in methanol to a temperature of 120° to 170° C. under a hydrogen pressure of between 70 and 200 atmospheres throughout the process in the presence of a catalyst consisting of nickel deposited on a carrier.

DONALD PETER YOUNG.

REFERENCES CITED

The following references are of record in the file of this patent:

UNITED STATES PATENTS

| Number | Name | Date |
|---|---|---|
| 2,374,283 | Grun | Apr. 24, 1945 |

FOREIGN PATENTS

| Number | Country | Date |
|---|---|---|
| 397,883 | Great Britain | Sept. 1, 1933 |
| 514,342 | Great Britain | Nov. 6, 1939 |
| 514,693 | Great Britain | Nov. 15, 1939 |
| 664,270 | Germany | Sept. 29, 1938 |

OTHER REFERENCES

Halasz Chemical Abstracts, 36, 452 (1942).